(12) United States Patent
Larson

(10) Patent No.: US 6,359,623 B1
(45) Date of Patent: Mar. 19, 2002

(54) METHOD AND APPARATUS FOR PERFORMING SCAN CONVERSION IN A COMPUTER GRAPHICS DISPLAY SYSTEM

(75) Inventor: Ronald D. Larson, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/190,666

(22) Filed: Nov. 12, 1998

(51) Int. Cl.[7] ............................................. G06F 15/00
(52) U.S. Cl. ........................ 345/501; 345/561; 345/421
(58) Field of Search ............................... 345/422, 421, 345/501, 561–563, 545

(56) References Cited

U.S. PATENT DOCUMENTS 5,381,519 A * 1/1995 Brown et al. ................ 395/132
5,579,455 A * 11/1996 Greene et al. ............... 345/422
5,600,763 A * 2/1997 Greene et al. ............... 345/420

OTHER PUBLICATIONS

Computer Graphic Proceedings, Annual Coference Series, 1993; Ned Green, et al.; Hierarchical Z–Buffer Visibility, pp. 231–238.

Computer Graphics Proceedings, Annual Conference Series, 1996; Ned Green w/Apple Computer; Hierarchical Polygon Tiling with Coverage Masks; pp. 65–74.

* cited by examiner

Primary Examiner—Kee M. Tung

(57) ABSTRACT

A method and apparatus for performing scan conversion in a computer graphics display system to determine pixel locations in screen space which correspond to a primitive being scan converted. The apparatus of the present invention comprises logic configured to convert a primitive into pixel locations in screen space. The logic, which is referred to hereinafter as the hierarchical tiler, subdivides the screen space into a plurality of regions, each of which comprises a plurality of pixel locations in screen space. The hierarchical tiler then determines whether a particular one of the regions is entirely outside of the primitive, entirely inside of the primitive, or partially inside of the primitive. If the hierarchical tiler determines that a particular region is entirely inside of the primitive, it converts the particular region into pixel locations in screen space. If the hierarchical tiler determines that the particular region is partially inside of the primitive, it further subdivides the particular region into a plurality of sub-regions. The hierarchical tiler then determines whether a particular one of the plurality of sub-regions is entirely outside of the primitive, entirely inside of the primitive, or partially inside of the primitive. If the hierarchical tiler determines that a particular sub-region is entirely inside of the primitive, it converts the particular sub-region into pixel locations in screen space. This process of subdividing the screen space into smaller regions continues until either a region is found to be contained within a primitive and is converted into pixels, or until screen space has been subdivided all of the way down to the pixel level.

20 Claims, 10 Drawing Sheets

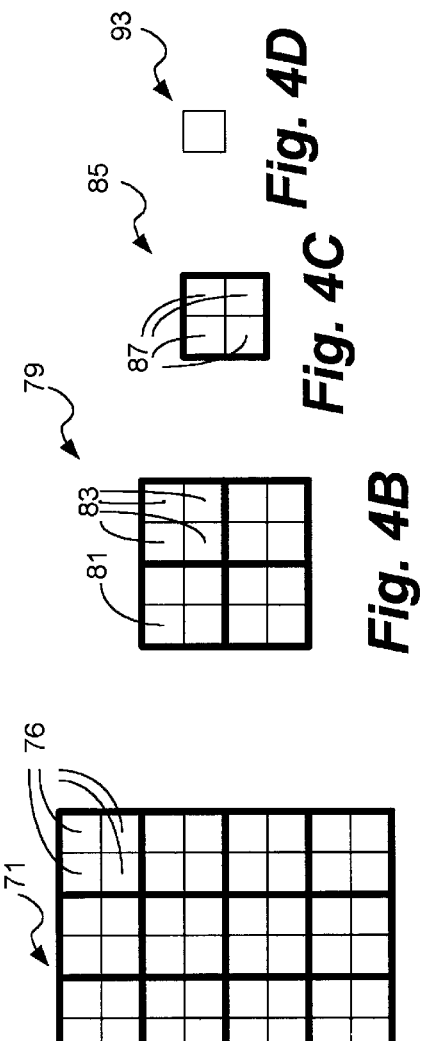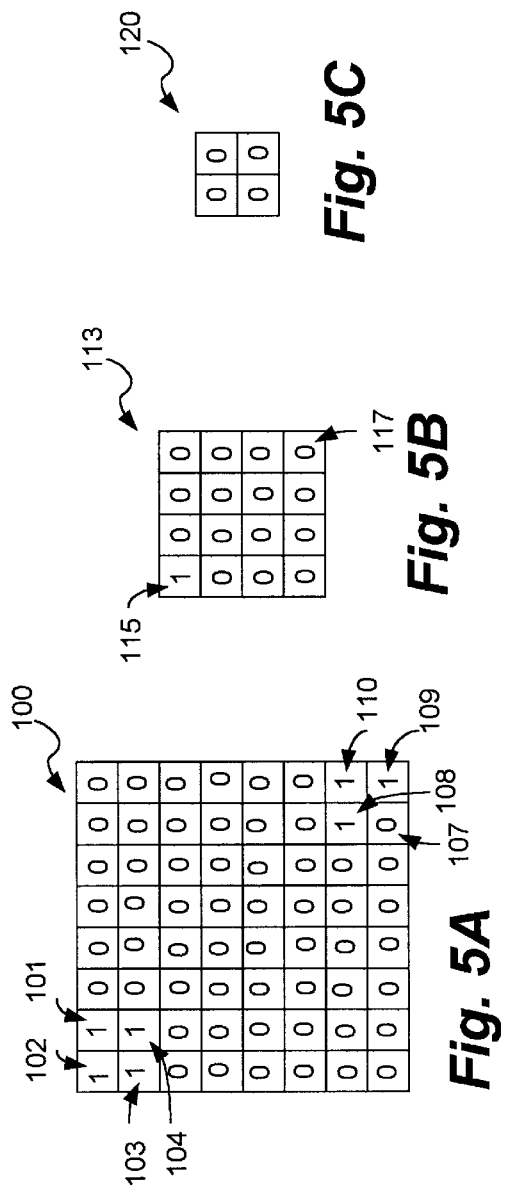

METHOD AND APPARATUS FOR PERFORMING SCAN CONVERSION IN A COMPUTER GRAPHICS DISPLAY SYSTEM

TECHNICAL FIELD OF THE INVENTION

The present invention relates to a computer graphics display system and, more particularly, to a method and apparatus for performing scan conversion in a computer graphics display system.

BACKGROUND OF THE INVENTION

In three-dimensional (3-D) computer graphics display systems, primitives are rendered on a display device of the computer graphics display system to produce a visual image on the display device. Each primitive is defined by X, Y and Z values of the primitive, by the normals of the vertices of the primitive, and by the colors of the vertices. Computer graphics display systems have been proposed which would utilize a Z pyramid memory element, or Z buffer, to test for primitive occlusion. For example, one such system was proposed in an article entitled "Hierarchical Z-Buffer Visibility", SIGGRAPH 93, Anaheim, Calif., Aug. 1–6 1993, by Greene, et al., that would utilize a Z pyramid memory element, or Z buffer, to test for primitive occlusion.

In the system proposed by Greene et al., the Z buffer stores the Z values for a current frame of pixels in a data structure arranged as a pyramid of Z values. These Z values in the pyramid are utilized in a hierarchical tiler to test new Z values to determine whether a each primitive associated with a new Z value is occluded. If a primitive is found to be occluded, there is no need to scan convert the primitive into pixels because the occluded primitive should not be displayed on the display device. This is because, if the occluded primitive is displayed, the occluded primitive will cover another primitive which is supposed to be in front of the occluded primitive in the image being rendered on the display device.

The article by Greene, et al. discusses building the Z pyramid from the original Z buffer and using the Z pyramid to test cubes comprised of a plurality of primitives for occlusion culling. This approach makes use of the observation that the cube is hidden with respect to the Z buffer if all of its faces correspond to hidden polygons.

Prior to performing this comparison, the Z pyramid is constructed by starting with pixel-level Z values as the base of the pyramid and by comparing subgroups of adjacent Z values to determine the maximum Z value for each subgroup. The maximum Z value for that subgroup is then stored in the Z buffer for the next level up in the pyramid. For example, if 64 Z values were contained in the Z buffer when the comparison began, the next level up in the pyramid will contain 16 Z values, with each of the 16 Z values corresponding to the maximum Z value of the four pixels compared in the corresponding subgroup in the level below it.

In this next level up, the Z values of each subgroup of four adjacent Z values are compared to determine the maximum Z value for each subgroup and then this maximum Z value is stored in the Z buffer for the next level up in the pyramid. Therefore, for the next level up in the pyramid, the Z buffer will contain four Z values. These four Z values are then compared to determine the maximum Z value, which is stored in the Z buffer for the next level up in the pyramid. This last maximum Z value corresponds to the top of the pyramid.

In the computer graphics display system proposed by Greene et al., once the Z pyramid has been constructed, the Z values for the primitives making up the faces of the cubes are compared beginning at a particular level of the pyramid and working down towards the base of the pyramid. For each primitive, the minimum Z value of the primitive is tested against the levels of the pyramid in a top-to-bottom sequence. If the minimum Z value for the primitive is greater than the pyramid Z value, then the primitive is fully occluded. If all of the primitives making up the faces of the cube are occluded, the cube is occluded and can be discarded. If not, the process continues at each level of the pyramid until the cube is either fully occluded or until the process reaches the level in the Z pyramid at which a primitive is found to be at least partially visible. Once a primitive corresponding to a face of the cube is found to be at least partially visible, the entire cube is scan converted into pixels using a typical scan conversion process.

Scan conversion is a process which determines the exact pixel locations on the screen of the display device that correspond to the primitives. Scan conversion is normally performed by an edge stepper engine which steps down along the edges of a primitive until a point on the edge of the primitive is reached at which the primitive intersects a scan line, and then steps across the span corresponding to the scan line to determine the point on the opposite side of the primitive at which the scan line intersects the primitive.

One disadvantage of the typical approach to performing scan conversion is that the typical approach begins at the pixel level at a starting pixel location, which must be determined for each span by either the host central processing unit (CPU) or by the geometry accelerator of the computer graphics display system. Determining the starting pixel location and the parameters associated with the starting pixel location for each span is a mathematically intensive process. Once the starting pixel location and the parameters associated with it have been determined for a particular span, the edge stepper then steps across the primitive in the above-discussed manner.

Another disadvantage of the typical approach to scan conversion is that it results in one-dimensional locality of pixels because of the manner in which an entire span of pixels are obtained for a scan line in the x direction (i.e., horizontal) before the next span of pixels are obtained for the next scan line. This results in one-dimensional grouping of pixels, i.e., grouping in terms of the x dimension in screen space, which does not facilitate organization and storage of pixels in the frame buffer memory. In order to maximize the speed with which pixels are read out of the frame buffer memory and sent to the display monitor, it is desirable to group pixels in the frame buffer memory in groups having two-dimensional locality, i.e., in terms of the x and y dimensions in screen space.

It would be advantageous to utilize a scan conversion process which would eliminate the necessity of determining the starting pixel location for each span and thereby simplify the scan conversion process. It would also be advantageous to link the scan conversion process with the occlusion testing process performed in the hierarchical tiler in order to take advantage of the hierarchy of the Z pyramid. This would enable the occlusion testing process and the scan conversion process to be performed simultaneously in the hierarchical tiler, which could significantly increase the overall throughput of the computer graphics display system. It would also be advantageous to utilize a scan conversion process which scan converts primitives into pixels which are grouped in terms of the x and y dimensions in screen space.

Accordingly, a need exists for an improved method and apparatus for performing scan conversion. A need also exists for a scan conversion process, which is performed in a hierarchical tiler simultaneously with occlusion testing.

SUMMARY OF THE INVENTION

The present invention provides a method and apparatus for performing scan conversion in a computer graphics display system to determine pixel locations in screen space corresponding to a primitive being scan converted. Screen space corresponds to x and y coordinates of pixel locations on a display monitor of the computer graphics display system. The apparatus of the present invention comprises logic configured to convert a primitive into pixel locations in screen space, wherein each pixel location is defined by an x coordinate and by a y coordinate in screen space. Each primitive has a plurality of vertices, each of which is defined by an x coordinate and by a y coordinate in screen space.

The logic, which will be referred to hereinafter as the hierarchical tiler, subdivides the screen space into a plurality of regions, each of which comprises a plurality of pixel locations in screen space. The hierarchical tiler then determines whether a particular one of the regions is entirely outside of the primitive, entirely inside of the primitive, or partially inside of the primitive. If the hierarchical tiler determines that a particular region is entirely inside of the primitive, it converts the particular region into pixel locations in screen space. If the hierarchical tiler determines that the particular region is partially inside of the primitive, it subdivides the particular region into a plurality of sub-regions, each sub-region being comprised of a plurality of pixel locations in screen space. The hierarchical tiler then determines whether a particular one of the plurality of sub-regions is entirely outside of the primitive, entirely inside of the primitive, or partially inside of the primitive. If the hierarchical tiler determines that a particular sub-region is entirely inside of the primitive, it converts the particular sub-region into pixel locations in screen space.

The hierarchical tiler preferably only determines whether a particular region or sub-region is entirely inside of a primitive after it has determined that the particular region or sub-region is not entirely outside of the primitive. The hierarchical tiler preferably only determines whether a particular region or subregion is partially inside of a primitive after it has determined that the particular region or sub-region is not entirely inside of the primitive.

In accordance with the preferred embodiment of the present invention, the hierarchical tiler performs scan conversion in conjunction with occlusion testing. In accordance with an alternative embodiment of the present invention, the scan conversion process of the present invention is an entirely separate process which is performed separately from occlusion testing. In accordance with the preferred embodiment of the present invention, when the hierarchical tiler determines that a particular region is entirely inside of a particular primitive, it determines whether or not the particular primitive is occluded before converting the particular region into pixel locations. The particular region is only converted into pixel locations in screen space if the hierarchical tiler determines that the particular primitive is not occluded.

When the hierarchical tiler determines that a particular region is partially inside of the particular primitive, it then determines whether the particular primitive is occluded. If the hierarchical tiler determines that the particular primitive is not occluded, it subdivides the particular region found to be partially inside of the particular primitive into a plurality of sub-regions. Each sub-region is comprised of a plurality of pixel locations in screen space. The hierarchical tiler then determines whether a particular one of the sub-regions is entirely outside of the particular primitive, entirely inside of that particular primitive, or partially inside of the particular primitive.

If the hierarchical tiler determines that a particular sub-region is entirely inside of the particular primitive, it then determines whether or not the particular primitive is occluded. If the hierarchical tiler determines that the particular primitive is not occluded, it converts the particular sub-region determined to be inside of the particular primitive into pixel locations in screen space. The pixels are then sent downstream for further processing in the graphics pipeline of the computer graphics display system. If the hierarchical tiler determines that the particular sub-region is partially inside of the particular primitive, it then determines whether or not the particular primitive is occluded.

If the hierarchical tiler determines that the particular primitive is not occluded, it subdivides the particular sub-region into a plurality of smaller subregions, each of which is comprised of a plurality of pixel locations in screen space. The hierarchical tiler then determines whether a particular one of these smaller sub-regions is entirely outside of the particular primitive, entirely inside of that particular primitive, or partially inside of the particular primitive. The process continues in this manner until a region or sub-region is found to be entirely or partially contained within a primitive and has been converted into pixels or until the pixel level is reached.

These and other advantages and features of the present invention will become apparent from the following description, drawings and claims.

BRIEF DESCRIPTION OF THE DRAWINGS

FIGS. 4A–4D illustrate different levels of the Z pyramid used for occlusion testing by the macro-function unit shown in FIG. 3.

FIGS. 5A–5C correspond to coverage masks used for updating the Z pyramid levels illustrated in FIGS. 4A–4C.

DETAILED DESCRIPTION OF THE INVENTION

As stated above, in accordance with the preferred embodiment of the present invention, the scan conversion process of the present invention is performed in the hierarchical tiler of the computer graphics display system as primitives are tested for occlusion in the hierarchical tiler. In accordance with the preferred embodiment of the present invention, the Z pyramid data structure used to test primitives for occlusion is updated "on the fly" as primitives are processed through the graphics pipeline of the computer graphics display system. Therefore, a detailed discussion will first be provided of the hierarchical tiler of the present invention, of the manner in which it is used to perform occlusion testing, and of the manner in which the Z pyramid data structure is updated on the fly.

After a detailed discussion of the occlusion testing method of the present invention has been provided, a detailed discussion will be provided of the scan conversion process of the present invention and of the manner in which the scan conversion process of the present invention can be performed in the hierarchical tiler in conjunction with occlusion testing. However, as those skilled in the art will realize, the scan conversion process of the present invention does not need to be performed in conjunction with occlusion testing.

Figure 1:
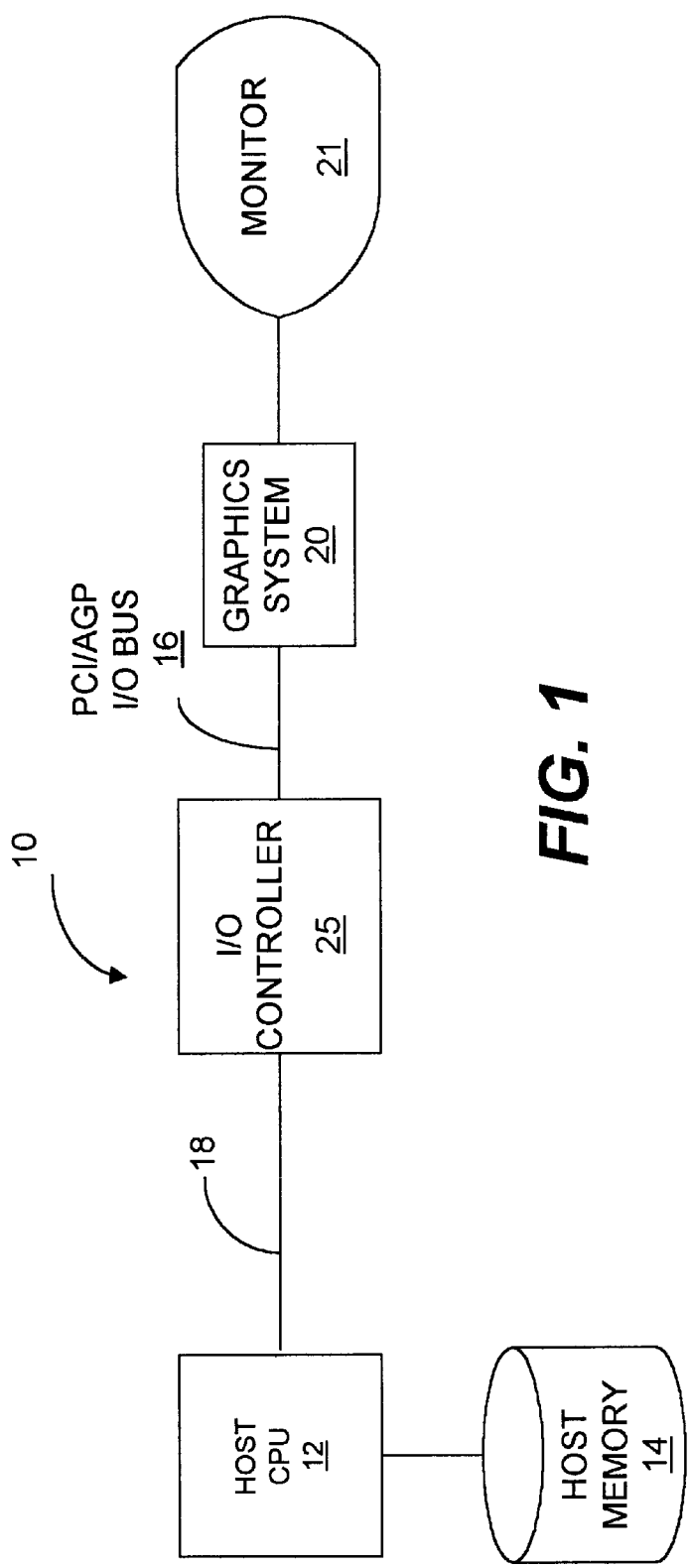
FIG. 1 is a block diagram of a computer graphics display system incorporating the graphics system of the present invention.

FIG. 1 is a block diagram of a computer graphics display system 10 comprising the graphics system 20 of the present invention in accordance with the preferred embodiment. The computer graphics display system 10 comprises a host CPU 12, a host memory device 14, a local bus 18, an input/output (I/O) controller device 25, an I/O bus 16, a graphics system 20, and a monitor 21 for displaying graphics information output from the graphics system 20.

The host CPU 12 processes input received from the console (not shown) of the computer graphics display system 10 and outputs commands and data over the local bus 18 to the I/O interface controller 25. The I/O interface controller 25 formats the commands and data utilizing the protocols of the I/O bus 16. The information received over the I/O bus 16 is input to the graphics system 20. The graphics system 20 then processes this information and causes graphics images to be displayed on the monitor 21.

Figure 2:
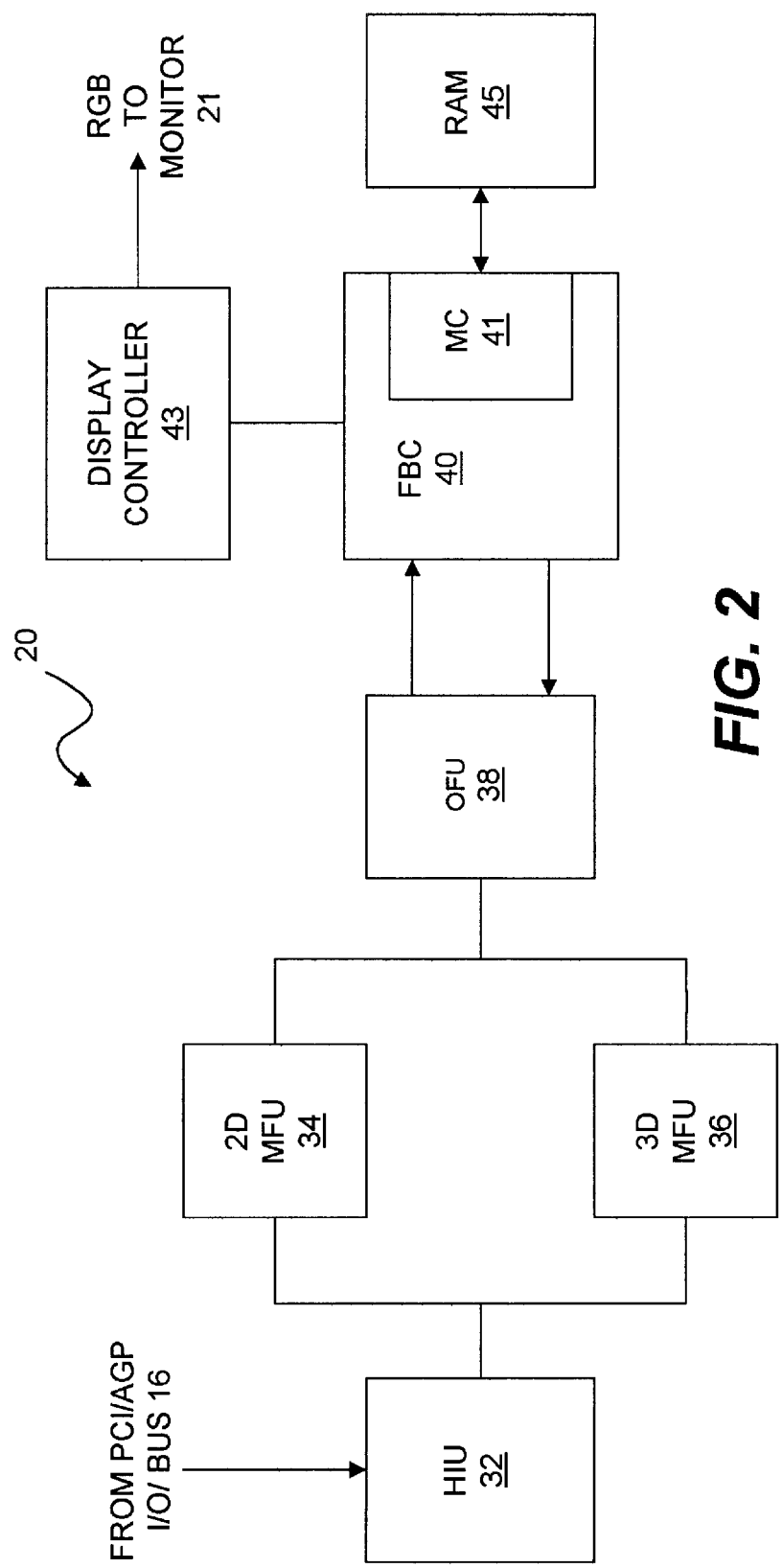
FIG. 2 is a block diagram of the graphics system of the computer graphics display system shown in FIG. 1.

FIG. 2 is a block diagram of the graphics system 20 of the present invention in accordance with the preferred embodiment. The host interface unit 32 fetches command data packets and texture maps from the host memory 14 via the I/O bus 16. The host interface unit 32 then provides graphics 2D information to the 2D macro-function unit (MFU) 34 and 3D information to the 3D macro-function unit (MFU) 36. The 2D macro-function unit 34 generates 2D vectors, text and rectangle spans. The 3D macro-function unit 36 performs triangle setup, 3D rastorization, and texture mapping, as discussed in more detail below with respect to FIG. 3. The 3D MFU 36 preferably also performs occlusion testing in accordance with the present invention, as discussed in detail below with respect to FIGS. 3–8. Preferably, the 3D MFU 36 also performs scan conversion in accordance with the methods of the present invention discussed below with respect to FIGS. 9 and 10.

The output from the 2D and 3D macro-function units 34 and 36 is received by the object function unit (OFU) 38. The object function unit 38 performs rectangle clipping, patterning, frame buffer-to-frame buffer block transfers and rectangle span fills. The output of the object function unit 38 is received by the frame buffer controller (FBC) 40. The frame buffer controller 40 dispatches requests to the memory controller (MC) 41 to cause the memory controller 41 to write and read pixel colors and Z coordinates to and from RAM 45. The frame buffer controller 40 also fetches display information which is sent to the display controller 43. The display controller 43 receives the display information and converts it into red, green and blue (RGB) analog data and sends it to the display monitor 21.

OCCLUSION TESTING IN ACCORDANCE WITH THE PREFERRED EMBODIMENT OF THE PRESENT INVENTION

Figure 3:
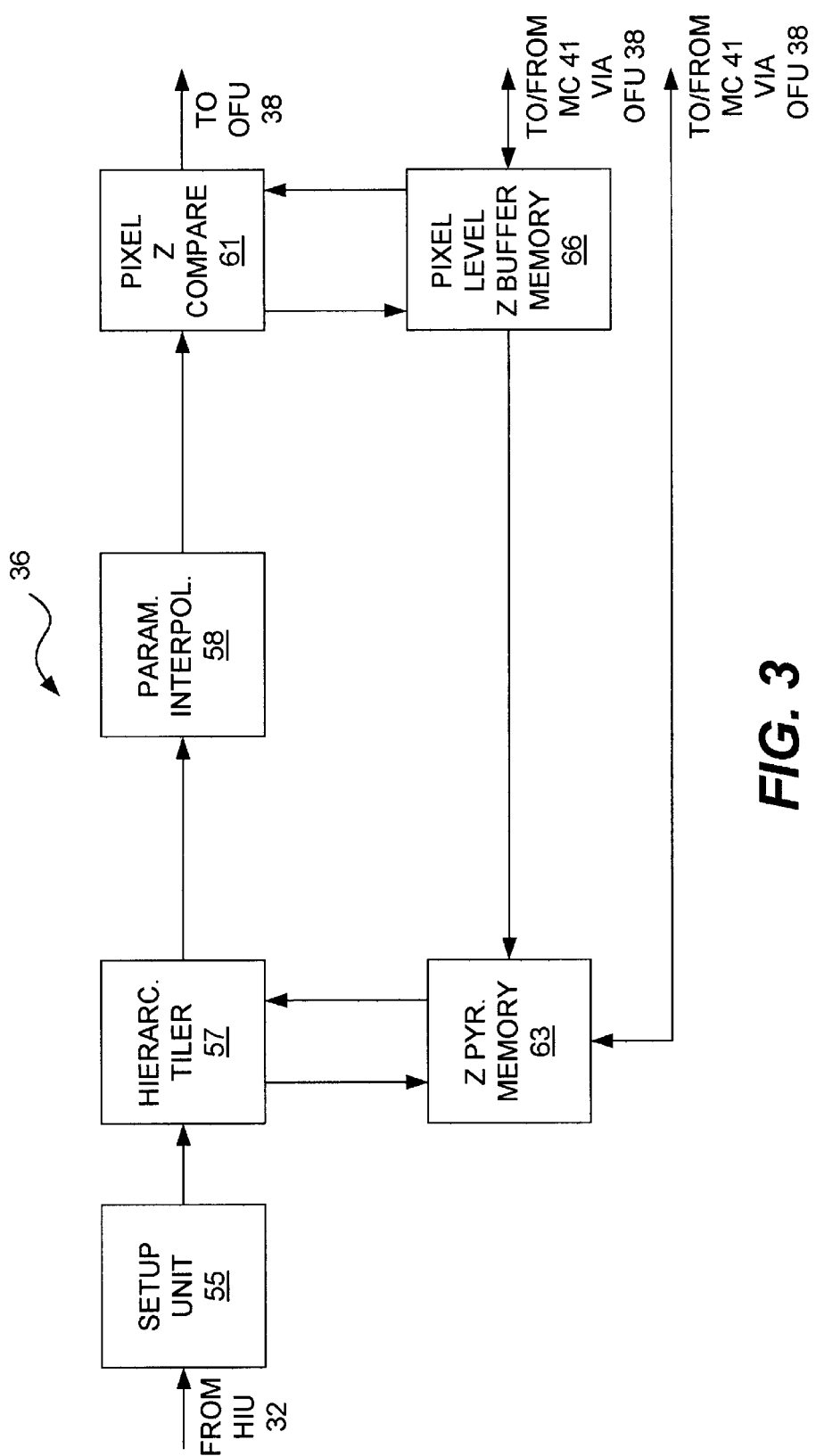
FIG. 3 is a block diagram of the macro-function unit of the graphics system shown in FIG. 2 in accordance with the preferred embodiment of the present invention.

FIG. 3 is a block diagram of the 3D macro-function unit 36 shown in FIG. 2. The setup unit 55 of the 3D macro-function unit 36 sets up plane equations for the polygons by using the X, Y values for the vertices of the polygons. The manner in which this is accomplished is discussed below in detail with respect to FIG. 11. The Z values of the vertices are used by the setup unit 55 to determine the minimum and maximum Z values for each polygon, as discussed below in detail with respect to FIGS. 4A–8. The minimum and maximum Z values for each polygon are then output to the hierarchical tiler 57. The hierarchical tiler 57 builds the Z pyramid on the fly, i.e., as the polygons are being processed through the graphics pipeline. The hierarchical tiler 57 preferably performs occlusion testing using the minimum and maximum Z values for the polygons received from the setup unit 55. The hierarchical tiler 57 also generates and maintains the coverage masks in accordance with the present invention to update the Z pyramid, as discussed below in detail with respect to FIGS. 4A–8.

The hierarchical tiler 57 generates X and Y values for each of the visible primitives and provides the X and Y values to the parameter interpolator 58. The parameter interpolator 58 then calculates the exact Z values at the pixel level for each of the X and Y values received.

The exact Z values are then provided to the pixel Z-compare component 61. The pixel Z-compare component 61 then determines, at the pixel level, which values need to be written by the memory controller 41 of the frame buffer controller 40 to the Z buffer memory contained in RAM 45. In order to perform this pixel-level Z comparison test, the 3D macro-function unit 36 preferably comprises a pixel-level Z buffer memory 66 which stores the Z values obtained from the Z buffer memory comprised in RAM 45. The pixel Z compare component 61 uses these Z values to perform the pixel-level Z comparison tests.

Generally, the pixel-level Z comparison test compares batches of Z values stored in the frame buffer memory with the Z values generated by the parameter interpolator 58 to determine whether the Z values generated by the parameter interpolator 58 need to be stored in the Z buffer memory, or whether the pixel corresponding to the Z value is occluded. The pixel-level Z values to be stored in the Z buffer memory comprised in RAM 45 are then output to the object function unit 38 which then performs the tasks of rectangle clipping, patterning, frame buffer-to-frame buffer block transfers, rectangle span fills, etc.

FIGS. 4A–4D illustrate various levels of the Z pyramid date structure stored in Z pyramid memory element 63 and used for occlusion testing in accordance with the occlusion testing method of the present invention. FIG. 4A represents the base level of the Z pyramid and FIGS. 4B–4D represent successively higher levels of the pyramid, with FIG. 4D representing the top level of the pyramid. For ease of illustration and discussion, the base level of the Z pyramid is represented in FIG. 4A as containing 64 Z values 73 which are grouped into 16 subregions of adjacent Z values, each having four Z values. Each four adjacent Z values of each subregion 76 are compared to determine the maximum Z value for each subregion.

The maximum Z values for each of the subregions are shown in FIG. 4B and represented by numeral 81. For this level of the pyramid 79, four subregions exist. Each subregion 83 in this level comprises four Z values. The four Z values for each of the four subregions 83 in level 79 are compared and the maximum Z values for each of the subregions 83 are saved. FIG. 4C represents the four maximum Z values resulting from the comparison of the Z values of the subregions 83 shown in FIG. 4B. The four Z values 87 of level 85 shown in FIG. 4C are then compared and the maximum Z value corresponds to the top level of the pyramid 93 shown in FIG. 4D.

In accordance with the occlusion testing method of the present invention, coverage masks are used to indicate whether or not regions and/or subregions are covered by a polygon. These coverage masks are used to determine whether the Z pyramid needs to be updated and, if so, which Z values of the pyramid need to be updated. FIGS. 5A–5C illustrate the coverage masks associated with the different levels of the pyramid represented by FIGS. 4A–4C, respectively. These coverage masks enable the Z pyramid to be updated on the fly as polygons are being processed through the pipeline of the graphics system 20. The coverage mask for each level of the pyramid preferably comprises one bit for each Z value in the corresponding level of the pyramid. Each of these individual Z values correspond to a subregion within the level of the pyramid associated with the particular mask. For example, level 71 of the pyramid shown in FIG. 4A comprises 16 regions, each of which comprises 4 subregions. Therefore, the corresponding coverage mask shown in FIG. 5A comprises 64 entries, i.e., one bit per subregion.

For each level of the pyramid, a Z MAX. PYR. value is stored for each region, which corresponds to the maximum Z value for the region. This value is used for region-by-region occlusion testing. A Z value is also stored for each subregion. This value is only used for occlusion testing if occlusion testing has resulted in a prior determination that the polygon is not fully occluded and does not fully cover the region. However, the values for the individual subregions are used for updating the Z pyramid, as described in detail below with respect to FIG. 7.

If the minimum Z value for the polygon, Z MIN. POLY., is less than the Z value for the subregion and the polygon fully covers the region, then the Z value for the subregion is updated with the maximum Z value for the polygon, Z MAX. POLY. However, the Z value for the subregion is only updated if the Z MAX. POLY. value is less than the current Z value for the subregion, Z MAX. PYR. The corresponding bit for the subregion is then set in the coverage mask corresponding to that level of the pyramid. When all of the bits of a subregion are set, the corresponding region bit is set in the coverage mask associated with the next level up in the Z pyramid. For example, with respect to pyramid level 71 shown in FIG. 4A, if subregion 73 and the three subregions adjacent to it are all covered by a polygon, the corresponding bits at locations 101, 102, 103 and 104 in coverage mask 100 shown in FIG. 5A will be set. Consequently, the corresponding bit 115 in the coverage mask 113 for the next level up in the pyramid shown in FIG. 5B will also be set.

When some but not all of the bits for a region are set, as indicated by locations 107, 108, 109 and 110 in coverage mask 100 shown in FIG. 5A, the corresponding bit in the coverage mask for the next level up in the pyramid will not be set, as indicated in coverage mask 113 shown in FIG. 5B. Since only one of the bits in the coverage mask 113 shown in FIG. 5B are set, none of the bits in the coverage mask 120 shown in FIG. 5C are set.

When all of the bits in the coverage mask associated with a region are set, the Z values for all of the subregions of the region are compared to find the maximum value. This maximum Z value becomes the Z MAX. PYR. value for that region and is used to perform occlusion testing.

Figure 6:
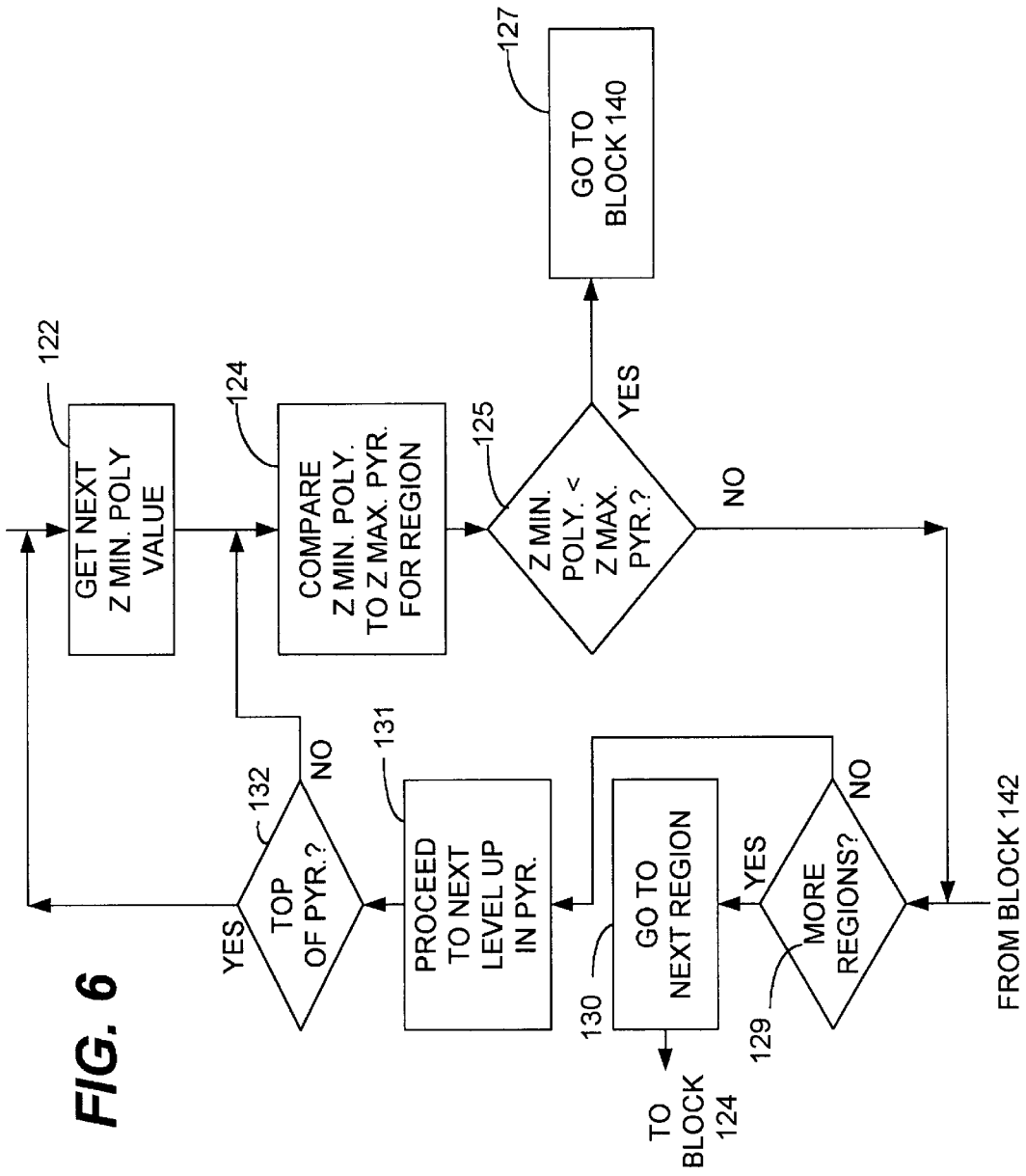
FIGS. 6–8 are flow charts illustrating the method of the present invention for performing occlusion testing and for updating the Z pyramid on the fly.
Figure 7:
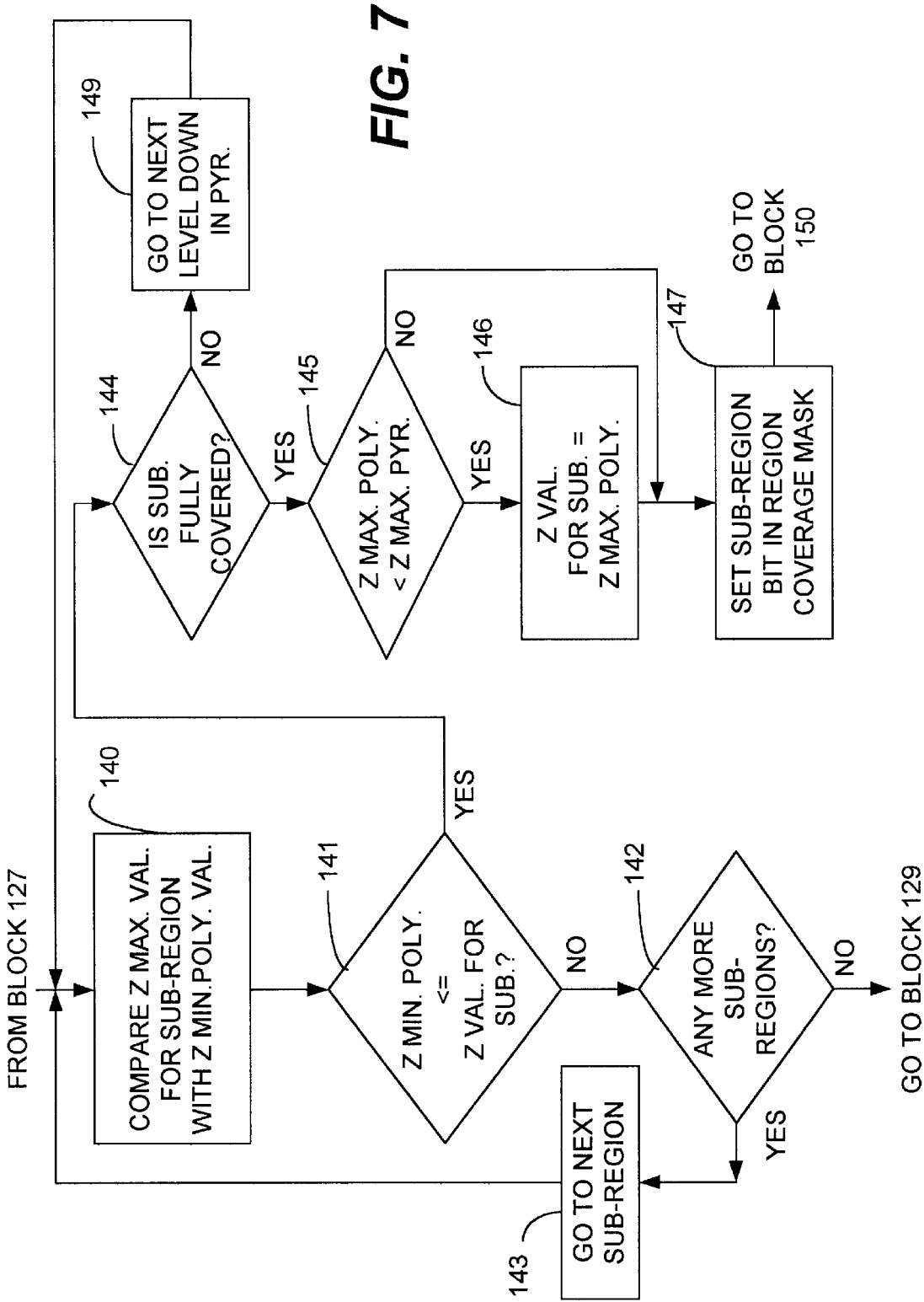

The method by which the Z pyramid represented by FIGS. 4A–4D is used to perform occlusion testing will now be discussed with respect to the flow charts of FIGS. 6–8. In accordance with the preferred embodiment of the present invention, the polygons are occlusion tested on a region-by-region basis by comparing the minimum Z value of each polygon against the maximum Z value for each region in the current level of the pyramid. A subregion-by-subregion comparison preferably is only performed if the region is not fully occluded by the polygon and if the region is not fully covered by the polygon.

Assuming that the Z pyramid has already been constructed, the first step of the occlusion testing process is to obtain the minimum Z value, Z MIN. POLY. for the polygon being occlusion tested, as indicated by block 122. The Z MIN. POLY. value is then compared to the Z MAX. PYR. value for the regions of the current level of the pyramid that intersect with the polygon, as indicated by block 124. Starting with the top level of the pyramid, a determination is made as to whether the Z MIN. POLY. value is less than the Z MAX. PYR. value, as indicated by block 125. If so, the polygon is at least partially visible, and the process proceeds to block 140 in FIG. 7, as indicated by block 127, for occlusion testing on a subregion-by-subregion basis, as described below in detail.

If a determination is made at block 125 that the Z MIN. POLY. value is not less than the Z MAX. PYR. value, the process proceeds to block 129 and a determination is then made as to whether there are anymore regions at the current level of the pyramid to be tested, as indicated by block 129.

When a determination is made at block 125 that the Z MIN. POLY. value is less than the Z MAX. PYR. value for the region, which means that the polygon being tested may be at least partially visible, the process proceeds to block 140 in FIG. 7. The Z value for each subregion is then compared with the Z MIN. POLY. value to determine whether or not the polygon is occluded by the subregions. If a determination is made at block 141 that the Z MIN. POLY. value is not less than or equal to the Z value for the subregion, a determination is made at block 142 as to whether there are any more subregions to be compared within the region. If not, the process returns to block 129 in FIG. 6. If, at block 142, a determination is made that there are more subregions within the region to be compared, the process proceeds to the next subregion within the region, as indicated by block 143. The Z value for the next subregion is then compared with the Z MIN. POLY. value, as indicated by block 140.

If a determination is made at block 141 that the Z MIN. POLY. value is less than or equal to the Z value for the subregion being compared, the process proceeds to block 144 where a determination is made as to whether the subregion is fully covered by the polygon. If so, a determination is then made as to whether the maximum Z value for the polygon being tested, Z MAX. POLY., is less than the Z MAX. PYR. value for the subregion, as indicated at block 145. If it is, the Z MAX. PYR. value for the subregion is assigned the value of the maximum Z value for the polygon, Z MAX. POLY., as indicated at block 146. The corresponding bit for the subregion is then set in the region coverage mask, as indicated at block 147, and then the process proceeds to block 150 in FIG. 8, as discussed below in detail, to determine whether the Z pyramid needs to be reconstructed with the updated Z buffer values.

If a determination is made at block 144 that the polygon does not fully cover the subregion, the process proceeds to the next level down in the pyramid, as indicated by block 149, and then returns to block 140 so that the polygon can be tested against the subregions in this level of the pyramid.

Figure 8:
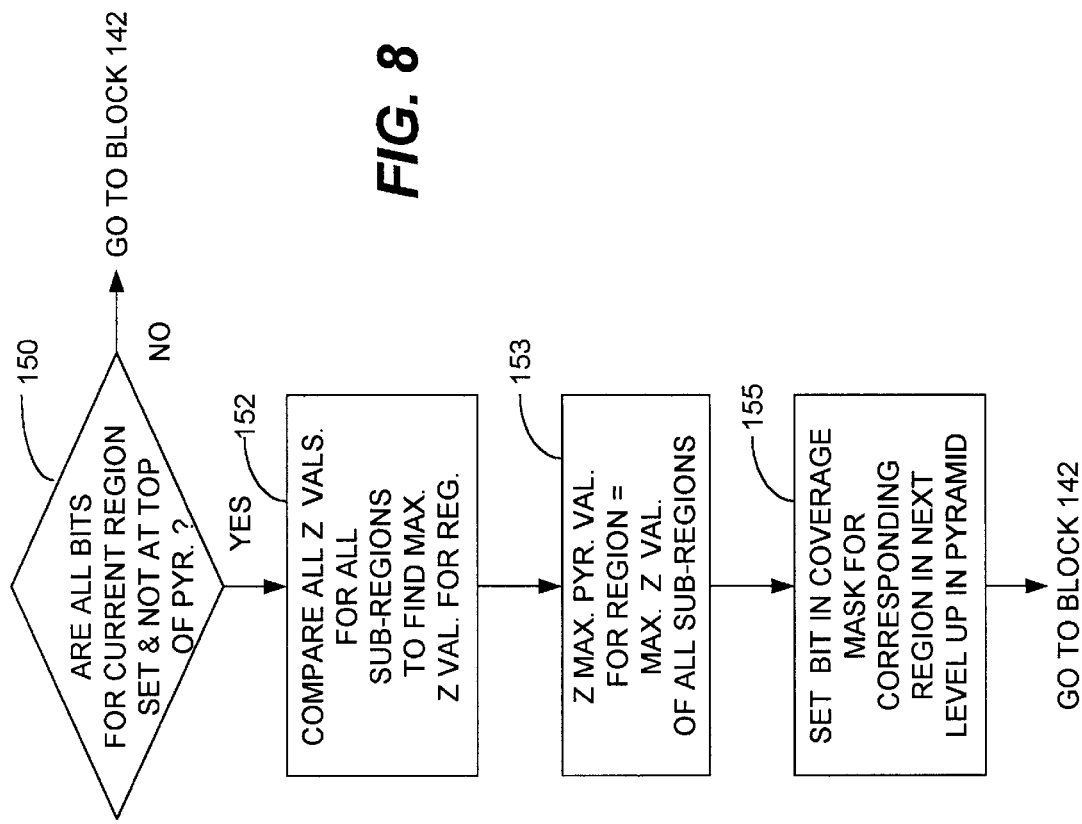

When the process proceeds to block 150 in FIG. 8, a determination is made as to whether or not the bits for all of the subregions of the current region have been set in the coverage mask. If not, the process returns to block 142 in FIG. 7 where a determination is made as to whether there are any more subregions to be tested against the polygon.

If a determination is made at block 150 that all bits corresponding to the region have been set in the coverage mask, and that the process is not at the top level of the pyramid, the maximum Z value for the region, Z MAX. PYR., is then assigned a value equal to the maximum Z value of all of the subregions, as indicated by block 153. This new value is then used in the block 125 in FIG. 6 to perform occlusion testing of the polygons on a region-by-region basis. The bit in the coverage mask corresponding to the region is then set in the coverage mask for the next level up in the pyramid, as indicated by block 155. The process then returns to block 142 in FIG. 7. The process also returns to block 142 when a determination is made at block 150 that either all bits for the current region are not set or that the process has reached the top level of the pyramid.

Whenever a coverage mask associated with a particular level of the Z pyramid is updated, a determination must be made as to whether the coverage masks associated with the higher levels in the pyramid must also be updated. For example, when the bits for all of the subregions associated with a region have been set in a coverage mask, the coverage mask associated with the next level up in the pyramid will need to be set. The process then proceeds to the next level up in the pyramid and a determination is then made as to whether the coverage mask associated with that level up in the pyramid needs to be set. This process continues until either the top level of the pyramid is reached or a determination is made that the corresponding bits in the coverage mask do not need to be set. When less than all of the bits for the subregions associated with a region have been set in a coverage mask, the coverage mask associated with the next level up in the pyramid will not need to be set. By updating the coverage masks in this manner, the Z pyramid is updated on the fly as the polygons are being processed through the graphics system 20.

Since the Z pyramid is updated on the fly using the minimum and maximum Z values for the polygons, the Z pyramid preferably is periodically rebuilt using pixel-level Z values provided from the pixel-level Z buffer memory element 66 to the Z pyramid memory element 63. This ensures the accuracy of the Z values used for occlusion testing and of the pixel-level Z values output from the MFU 36 to the OFU 38.

SCAN CONVERSION IN ACCORDANCE WITH THE PRESENT INVENTION

Figure 9:
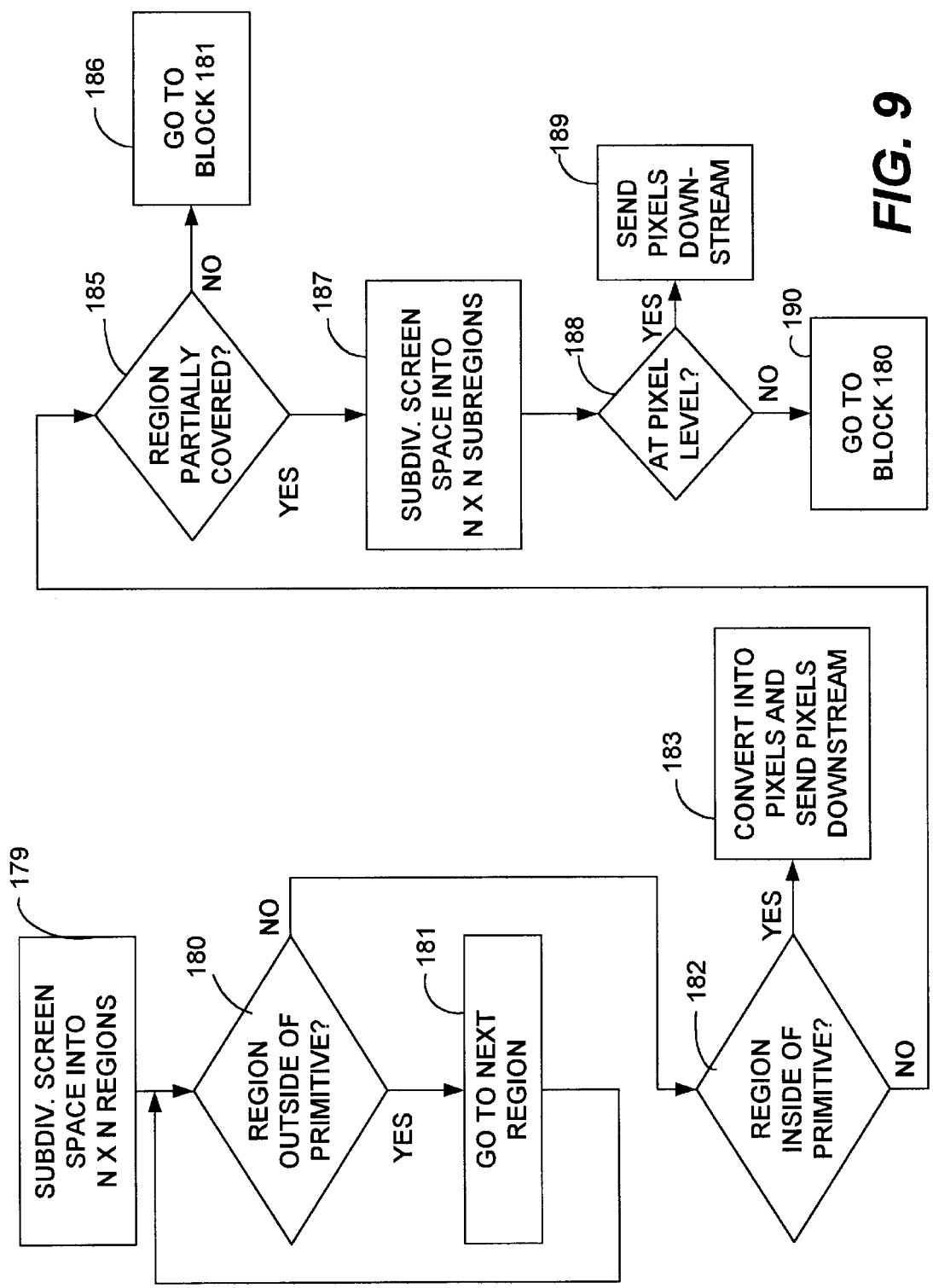
FIG. 9 is a flow chart functionally illustrating the method of the present invention for performing scan conversion.
Figure 10:
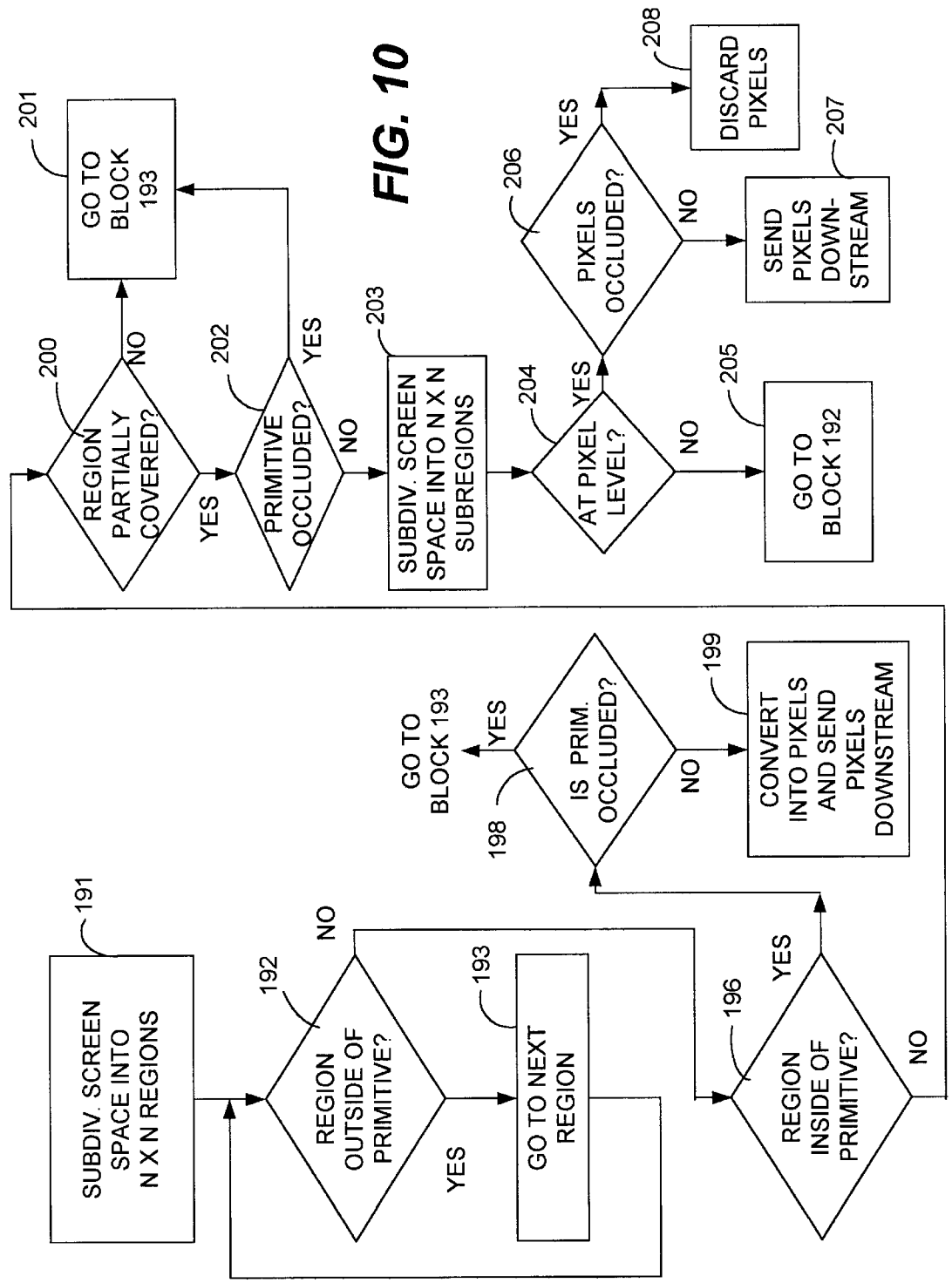
FIG. 10 is a flow chart functionally illustrating the method of the present invention in accordance with the preferred embodiment for performing scan conversion wherein scan conversion and occlusion testing are performed simultaneously.

FIG. 9 is a flow chart functionally illustrating the scan conversion process of the present invention in accordance with a first embodiment. In accordance with this embodiment, the scan conversion is an independent process which can be implemented at any suitable location in the graphics system 20. FIG. 10 is a flow chart functionally illustrating the scan conversion process of the present invention in accordance with the preferred embodiment. In accordance with the preferred embodiment, the scan conversion process is implemented in the hierarchical tiler 57 and is performed simultaneously with the occlusion testing process discussed above with respect to FIGS. 3–8.

As shown in FIG. 9, the screen space corresponding to the display monitor 21 is first subdivided into a plurality of N×N regions, as indicated by block 179, where N corresponds to an integer. The plane equations corresponding to the edges of a first primitive to be scan converted, which have previously been calculated in the setup unit 55, are then used to determine whether or not the coordinates associated with the corners of each N×N region are outside of the primitive, as indicated by block 180. If a determination is made at block 180 that all of the corners of the region are outside of the primitive, then no more work needs to be done in that area of the screen space. The process then proceeds to the next region, as indicated by block 181. A determination is then made as to whether all of the corners of the next region at that level of the screen space are outside of the primitive.

The portion of the process represented by blocks 180 and 181 continues until a determination is made at block 180 that all of the corners of a region are not outside of the primitive. When a determination is made at block 180 that all of the corners of the region are not outside of the primitive, then a determination is made as to whether or not all of the corners of the region are within the primitive, as indicated by block 182. If so, the region is converted into pixels, as indicated by block 183 and the pixels are sent downstream for further processing.

A plurality of methods are suitable for converting the regions into pixels once the pixel level has been reached, as will be apparent to those skilled in the art. In accordance with one of these methods, the region is converted into pixels by starting at the scan line having the minimum y coordinate of the region and identifying the pixels on the scan line in a direction from the minimum x coordinate of the region to the maximum x coordinate of the region. This is done for each scan line until the maximum y value for the region is reached.

Other methods can be used to convert the regions into pixels which group the pixels into two-dimensional regions to facilitate organization and storage of the pixels in the frame buffer RAM 45, as will be understood by those skilled in the art. For example, logic can be configured in the hierarchical tiler 57 to implement nested loops for the x and y screen space coordinates to group the pixels of the region into groups having two-dimensional locality. The manner in which this can be accomplished will be understood by those skilled in the art. Therefore, in the interest of brevity, a discussion of this algorithm will not be provided herein since designing code to perform this task would be a routine matter for those skilled in the art.

If a determination is made at block 182 that the region is not fully contained within the primitive, then the region must be tested to determine whether it is at least partially within the primitive, as indicated by block 185. It is possible that even if a determination is made at block 180 that the region is not fully outside of the primitive, the region may, in fact, be outside of the primitive. Therefore, a determination must be made as to whether the region is partially covered by the primitive. The manner in which this determination is made is discussed below in detail with respect to FIG. 11. If a determination is made at block 185 that the region is not partially covered by the primitive, the process proceeds to the next region to be tested, as indicated by block 186.

If a determination is made at block 185 that the region is partially covered by the primitive, the region which is partially covered by the primitive is further subdivided into a plurality of regions, as indicated by block 187. Each of these regions are then tested to determine whether the corners of the regions are within the primitive. Therefore, if the pixel level has not already been reached, as indicated by block 188, the process returns to the block 180, as indicated by block 190. The screen space continues to be subdivided down until the pixel level is reached, i.e., until the screen space has been subdivided down until the point is reached at which each region corresponds to a single pixel. Once the pixel level is reached, the exact pixel locations which correspond to the primitive will be known and the pixels which correspond to the primitive can be sent down stream for further processing, as indicated by block 189.

FIG. 10 is a flow chart representing the scan conversion method of the present invention in accordance with the preferred embodiment wherein scan conversion and occlusion testing are performed simultaneously. As shown in FIG. 10, the screen space corresponding to the display monitor 21 is first subdivided into a plurality of N×N regions, as indicated by block 191, where N corresponds to an integer. The plane equations corresponding to the edges of a first primitive to be scan converted are then used to determine whether or not the coordinates associated with the corners of each N×N region are outside of the primitive, as indicated by block 192. If a determination is made at block 192 that all of the corners of the region are outside of the primitive, then no more work needs to be done in that area of the screen space and the process then proceeds to the next region, as indicated by block 193. A determination is then made at the step represented by block 192 as to whether all of the corners of the next region at that level of the screen space are outside of the primitive.

The portion of the process represented by blocks 192 and 193 continues until a determination is made at block 192 that all of the corners of a region are not outside of the primitive. When a determination is made at block 192 that all of the corners of the region are not outside of the primitive, then a determination is made as to whether or not all of the corners of the region are within the primitive, as indicated by block 196. If so, then a determination is made as to whether the primitive is occluded, as indicated by block 198. If the primitive is not occluded, the region found to be contained within the primitive is converted into pixels, as indicated by block 199. The method for determining whether the primitive is occluded preferably is the method discussed above with respect to FIGS. 6–8. However, as will be understood by those skilled in the art, an occlusion testing method which is different from the occlusion testing method discussed herein may be used for this purpose.

If a determination is made at block 196 that the region is not fully contained within the primitive, then a determination must be made as to whether the region is at least partially covered by the primitive, as indicated by block 200. If the region is not at least partially covered by the primitive, the process returns to block 193 so that the next region can be tested, as indicated by block 201. If a determination is made at block 200 that the region is at least partially covered by the primitive, then a determination is made at block 202 as to whether the primitive is occluded. If so, the process returns to block 193, as indicated by block 201. If not, the partially covered region must be further subdivided into a plurality of regions, as indicated by block 203. Each of these regions are then tested to determine whether the corners of these regions are within the primitive. Therefore, if the process has not already reached the pixel level, as indicated by block 204, the process returns to the step represented by block 192, as indicated by block 205.

As long as the process continues to determine that a region is neither fully within nor fully outside of the primitive, the screen space will continue to be subdivided until the pixel level is reached, i.e., until the screen space has been subdivided down until the point is reached at which each subregion corresponds to a single pixel. Once the pixel level is reached, the exact pixel locations which correspond to the primitive will be known. The pixels are then occlusion tested, as indicated by block 206. If the pixels are not occluded, the pixels will be sent down stream for further processing, as indicated by block 207. If the pixels are occluded, they will be discarded, as indicated by block 208.

Figure 11:
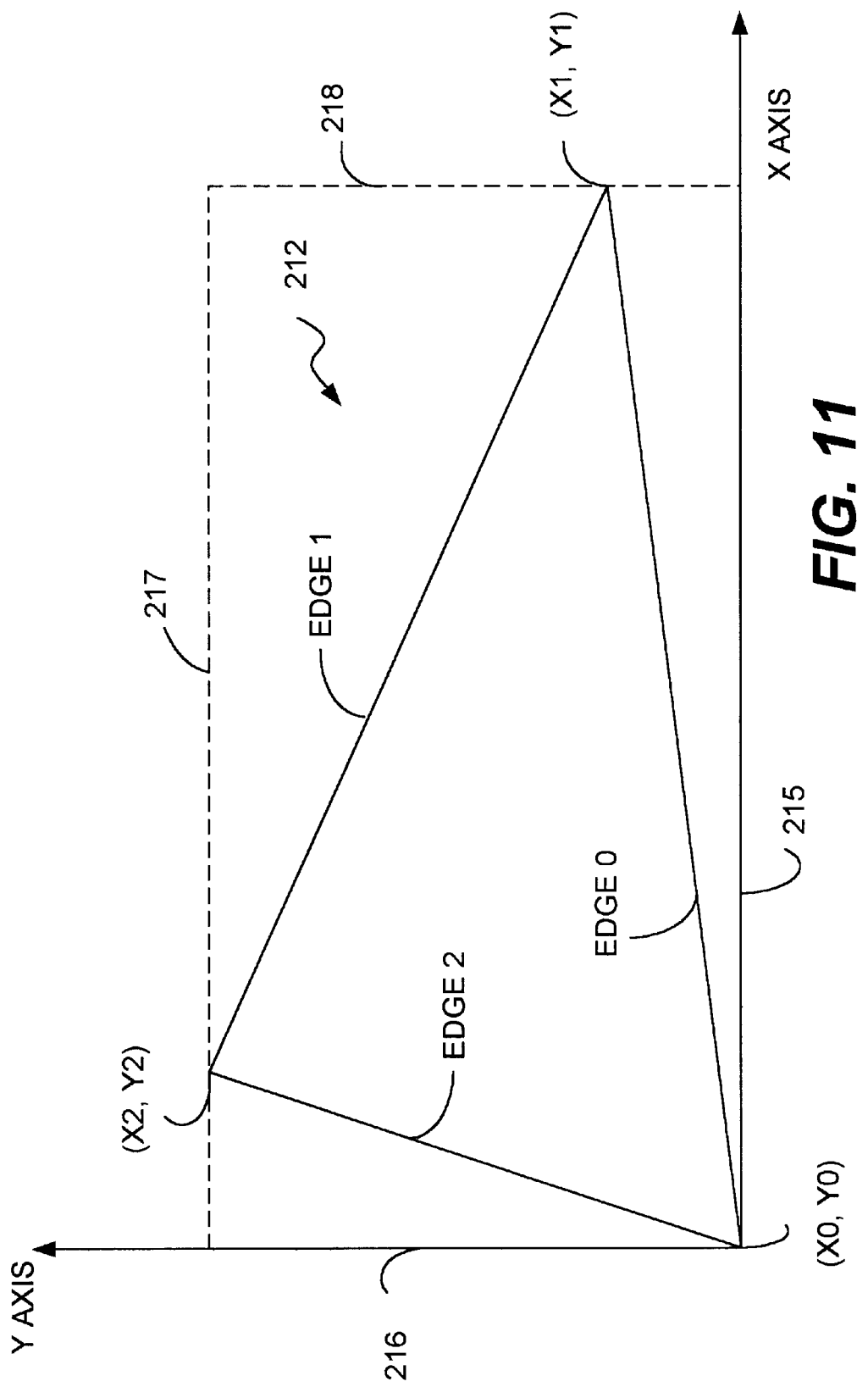
FIG. 11 illustrates a primitive to be scan converted in accordance with the present invention.

The manner in which the plane equations are used to determine whether the corners of a region are within a primitive will now be discussed with reference to FIG. 11. FIG. 11 illustrates a primitive 212 to be scan converted. The x and y coordinates of the vertices of the primitive are shown in FIG. 11. The coordinates of these vertices are used to calculate the plane equations for edges 0, 1 and 2, which preferably are calculated in a counter clockwise manner beginning with coordinates (x0, y0). The plane equations are given as:

$$Ax+By+C=0, \qquad \text{Equation (1)}$$

where A, B and C are constants. In order to calculate the plane equation for edge 0, A, B and C are calculated as follows:

$$A=y1-y0; \qquad \text{Equation (2)}$$

$$B=x0-x1; \text{ and} \qquad \text{Equation (3)}$$

$$C=-Ax0-By0. \qquad \text{Equation (4)}$$

In order to calculate the plane equation for edge 1, A, B and C are calculated as follows:

$$A=y2-y1; \qquad \text{Equation (5)}$$

$$B=x2-x1; \text{ and} \qquad \text{Equation (6)}$$

$$C=Ax1-By1. \qquad \text{Equation (7)}$$

In order to calculate the plane equation for edge 2, A, B and C are calculated as follows:

$$A=y0-y2; \qquad \text{Equation (8)}$$

$$B=x0-x2; \text{ and} \qquad \text{Equation (9)}$$

$$C=Ax2-By2. \qquad \text{Equation (10)}$$

Once the values A, B and C have been calculated for each edge, the plane equations for each edge are set up with their respective A, B and C values. The plane equations are used in the processes described above with respect to FIGS. 9 and 10 to determine whether the x and y screen coordinates corresponding to the corners of a region are all within a primitive, are all outside of a primitive, or whether a region is neither fully outside of, nor fully inside of a primitive.

A region is fully within a primitive, i.e., fully covered by a primitive, if the results of all of the plane equations are positive when the x and y coordinates corresponding to each of the corners of the region are used as the x and y values in Equation (1) for each edge. A region is fully outside of a primitive when the results of any one of the plane equations are negative for all four corners of the region when the x and y coordinates corresponding to each of the corners of the region are used as the x and y values in Equation (1) for each edge.

If a region is not found to be either fully inside nor fully outside of a primitive by using the above tests, a determination must be made as to whether a region is partially covered by a primitive. This is accomplished by first creating a rectangular bounding box about the primitive. In FIG. 11, the bounding box is shown and is comprised of the x axis 215, the y axis 216, the dashed line 217 and the dashed line 218. The bottom left corner of the bounding box corresponds to the coordinates (x0, y0) of the vertex of the primitive 212. The top left corner of the bounding box corresponds to the intersection of the dashed line 217 with the y axis, which corresponds to the coordinates (x0, y2). The top right corner of the bounding box corresponds to the intersection of dashed lines 217 and 218, which corresponds to the coordinates (x1, y2). The bottom right corner of the bounding box corresponds to the intersection of dashed line 218 and the x axis, which corresponds to the coordinates (x1, y0).

Once the bounding box is constructed, a determination can be easily made as to whether the region is fully outside of the primitive. If the maximum x value of the bounding box (x1 in FIG. 11) is less than the minimum x value of the region, the region is fully outside of the primitive.

Similarly, if the minimum x value of the bounding box (x0 in FIG. 11) is greater than the maximum x value of the region, the region is fully outside of the primitive. Similarly, if the maximum y value of the bounding box (y2 in FIG. 11) is less than the minimum y value of the region, the region is fully outside of the primitive. Similarly, if the minimum y value of the bounding box (y0 in FIG. 11) is greater than the maximum y value of the region, the region is fully outside of the primitive.

An alternative embodiment of the process for determining whether a region is partially covered by a primitive also uses the bounding box and is as follows. The plane equations for each edge of the bounding box are calculated using the coordinates of the bounding box to obtain the A, B and C values for the edge equations. A determination is made as to whether there is no plane equation for which all four corners of the region produce negative results when the x and y values of the corners of the region are used as the x and y values in the plane equations. A region is partially covered by the primitive if there is no plane equation for which all four corners of the region produce negative results. In other words, if there is any plane equation that produces negative results when the x and y values for all four corners of the region are used in the plane equation, the region is fully outside of the primitive.

It should be noted that the plane equations can be calculated in a clockwise, as opposed to counterclockwise manner, as will be understood by those skilled in the art. The present invention is not limited to the manner in which the plane equations are calculated. There may also be other suitable ways for determining whether a region of screen space is covered, either wholly or partially, by a primitive. Those skilled in the art will understand that methods for performing this task, other than those explicitly discussed herein, can be used with the methods described above with respect to FIGS. 9 and 10.

It should be noted that the present invention has been described with reference to the preferred embodiments of the present invention and that the present invention is not limited to these embodiments. It will also be understood by those skilled in the art that the hierarchical tiler 57 can be implemented in hardware, software, or as a combination of hardware and software. Preferably, the hierarchical tiler 57 is implemented as a state machine in an integrated circuit, although other hardware embodiments may be suitable for the hierarchical tiler 57, such as, for example, discrete electrical components. Those skilled in the art will understand that modifications may be made to the embodiments discussed above without deviating from the spirit and scope of the present invention.

What is claimed is:

1. An apparatus, comprising:
logic configured to convert a primitive into pixel locations in screen space, each pixel location being defined by an x coordinate and a y coordinate in screen space, each primitive having a plurality of vertices, each of said vertices being defined by an x coordinate and a y coordinate, said logic subdividing said screen space into a plurality of regions, each region corresponding to a plurality of pixel locations in screen space, said logic determining whether a particular one of said plurality of regions is entirely outside of said primitive, entirely inside of said primitive, or partially inside of said primitive, wherein when said logic determines that a particular region is entirely inside of said primitive, said logic converts the particular region into pixel locations in screen space, forwards a two-dimensional region of pixel information generated in a hierarchical tiler to a frame buffer, and wherein said logic performs a scan conversion of the two-dimensional region to determine pixel locations in screen space corresponding to a primitive.

2. The apparatus of claim 1, wherein if said logic determines that the particular region is partially inside of said primitive, said logic subdivides the particular region into a plurality of sub-regions, each sub-region being comprised of a plurality of pixel locations in screen space, said logic determining whether a particular one of said plurality of sub-regions is entirely outside of said primitive, entirely inside of said primitive, or partially inside of said primitive, wherein if said logic determines that a particular sub-region is entirely inside of said primitive, said logic converts the particular sub-region determined to be inside of said primitive into pixel locations in screen space.

3. The apparatus of claim 2, wherein said logic only determines whether a particular region or sub-region is entirely inside of a primitive after said logic has determined that the particular region or sub-region is not entirely outside of the primitive.

4. The apparatus of claim 3, wherein said logic only determines whether a particular region or sub-region is partially inside of a primitive after said logic has determined that the particular region or sub-region is not entirely inside of the primitive.

5. The apparatus of claim 4, wherein said logic is comprised in a hierarchical tiler component of the computer graphics display system.

6. The apparatus of claim 1, wherein when said logic determines that a particular region is entirely inside of a particular primitive, said logic determines whether or not the particular primitive is occluded before converting the particular region into pixel locations, wherein the particular region is only converted into pixel locations in screen space if said logic determines that the particular primitive is not occluded.

7. The apparatus of claim 6, wherein said logic only determines whether or not a particular region is partially inside of a particular primitive after said logic has determined that the particular region is not entirely inside of the particular primitive, wherein when said logic determines that a particular region is partially inside of the particular primitive, said logic determines whether the particular primitive is occluded, wherein if said logic determines that the particular primitive is not occluded, said logic subdivides the particular region found to be partially inside of the particular primitive into a plurality of sub-regions, each sub-region being comprised of a plurality of pixel locations in screen space.

8. The apparatus of claim 7, wherein said logic determines whether a particular one of said plurality of sub-regions is entirely outside of the particular primitive, entirely inside of that particular primitive, or partially inside of the particular primitive, wherein if said logic determines that a particular sub-region is entirely inside of the particular primitive, said logic determines whether or not the particular primitive is occluded, wherein if said logic determines that the particular primitive is not occluded, said logic converts the particular sub-region determined to be inside of the particular primitive into pixel location in screen space.

9. The apparatus of claim 8, wherein said logic determines whether or not a particular sub-region is entirely inside of a particular primitive after said logic has determinedd that the particular sub-region is not entirly outside of the particular primitive.

10. The apparatus of claim 9, wherein said logic only determines whether or not the particular sub-region is partially inside of a particular primitive after said logic has determined that the particular sub-region is not entirely inside of the particular primitive, wherein if said logic determined that the particular sub-region is partially inside of the particular primitive, said logic determines whether or not the particular primitive is occluded, wherein if said logic determines that the particular primitive is not occluded, said logic subdivides the paarticular sub-region into a plurality of smaller sub-regions, each of said smaller sub regions being comprised of a plurality of pixel locations in scrreen space.

11. A method for performing a scan conversion, comprising the steps of:

acquiring a primitive to be scan converted, the primitive having a plurality of vertices, each of said vertices being defined by an x coordinate and by a y coordinate in screen space;

subdividing screen space into a plurality of regions, each region corresponding to a plurality of pixel locations in screen space;

determining whether a particular one of said plurality of regions is entirely outside of said primitive, entirely inside of said primitive, or partially inside of said primitive; and when a determination is made that a particular region is entirely inside of said primitive, the particular region is converted into pixel locations in screen space, wherein screen space corresponds to x and y coordinates of pixel locations on a display monitor, and wherein the conversion generates pixels over the particular two-dimensional region.

12. The method of claim 11, further comprising the steps of:

if a determination is made that the particular region is partially inside of the primitive, subdividing the particular region into a plurality of sub-regions, each sub-region being comprised of a plurality of pixel locations in screen space;

determining whether a particular one of said plurality of sub-regions is entirely outside of said primitive, entirely inside of said primitive, or partially inside of said primitive; and if a determination is made that a particular sub-region is entirely inside of said primitive, converting the particular sub-region determined to be inside of said primitive into pixel locations in screen space.

13. The method of claim 12, wherein the steps of determining whether a particular region or sub-region is entirely inside of a primitive are only made after a determination has been made that the particular region or sub-region is not entirely outside of the primitive.

14. The method of claim 13, wherein the steps of determining whether a particular region or sub-region is partially inside of a primitive are only made after a determination has been made that the particular region or sub-region is not entirely inside of the primitive.

15. The method of claim 11, wherein if a determination is made that a particular region is entirely inside of a particular primitive, then a determination is made as to whether or not the particular primitive is occluded before the particular region is converted into pixel locations in screen space, wherein the particular region is only converted into pixel locations in screen space if a determination is made that the particular primitive is not occluded.

16. The method of claim 15, wherein a determination as to whether or not a particular region is partially inside of a particular primitive is only made after a determination has been made that the particular region is not entirely inside of the particular primitive, wherein when a determination is made that a particular region is partially inside of the particular primitive, then a determination is made as to whether the particular primitive is occluded, wherein if a determination is made that the particular primitive is not occluded, then the particular region found to be partially inside of the particular primitive is subdivided into a plurality of sub-regions, each sub-region being comprised of a plurality of pixel locations in screen space.

17. The method of claim 16, further comprising the steps of:

determining whether a particular one of said plurality of sub-regions is entirely outside of the particular primitive, entirely inside of the particular primitive, or partially inside of the particular primitive;

if a determination is made that a particular sub-region is entirely inside of the particular primitive, determining whether or not the particular primitive is occluded;

if a determination is made that the particular primitive is not occluded, converting the particular sub-region determined to be inside of the particular primitive into pixel locations in screen space.

18. The method of claim 17, wherein the steps of determining whether or not a particular sub-region is entirely inside of a particular primitive is only made after a determination has been made that the particular sub-region is not entirely outside of the particular primitive.

19. The method of claim 18, wherein the step of determining whether or not the particular sub-region is partially inside of a particular primitive is only made after a determination has been made that the particular sub-region is not entirely inside of the particular primitive, wherein if a determination is made that the particular sub-region is partially inside of the particular primitive, a determination is made as to whether or not the particular primitive is occluded, wherein if a determination is made that the particular primitive is not occluded, the particular sub-region is subdivided into a plurality of smaller sub-regions, each of said smaller sub-regions being comprised of a plurality of pixel locations in screen space.

20. A computer program embodied on a computer-readable medium, comprising:

a first code segment which subdivides screen space into a plurality of regions, each region corresponds to a plurality of pixel locations in screen space;

a second code segment which determines whether a particular one of said plurality of regions is entirely outside of said primitive, entirely inside of said primitive, or partially inside of said primitive; and a third code segment which converts the particular region into pixel locations in screen space when a determination is made by the second code segment that a particular region is entirely inside of said primitive, wherein screen space corresponds to x and y coordinates of pixel locations on a display monitor, and wherein the conversion generates pixels over the particular two-dimensional region.

* * * * *